Nov. 8, 1966  M. R. PAYNE  3,283,426
RIPPING TOOTH FOR EARTH-SCRAPING BLADES
Filed Nov. 19, 1964  2 Sheets-Sheet 1

MORRIS R. PAYNE
INVENTOR

BY
BUCKHORN, BLORE, KLARQUIST & SPARKMAN
ATTORNEYS

Nov. 8, 1966  M. R. PAYNE  3,283,426
RIPPING TOOTH FOR EARTH-SCRAPING BLADES
Filed Nov. 19, 1964  2 Sheets-Sheet 2

MORRIS R. PAYNE
INVENTOR
BY
BUCKHORN, BLORE, KLARQUIST & SPARKMAN
ATTORNEYS

United States Patent Office 3,283,426
Patented Nov. 8, 1966

3,283,426
RIPPING TOOTH FOR EARTH-SCRAPING BLADES
Morris R. Payne, Rte. 1, Box 424, Warrenton, Oreg.
Filed Nov. 19, 1964, Ser. No. 412,488
11 Claims. (Cl. 37—145)

The present invention relates to earth-moving equipment and more particularly to a ripping tooth for attachment to the scraper blades of earth scrapers, bulldozers, loaders and the like for loosening hard-packed earth, rocks and other objects to facilitate their movement by the blades and to protect such blades and their supporting structures from abuse.

Heretofore attempts have been made to affix ripping teeth rigidly to the cutting edges of scraper blades, but teeth thus mounted are easily torn from the blade or broken when hooked solidly on boulders or other obstructions. Moreover, such teeth must be removed from the blade when the equipment performs finish-grading operations.

Accordingly, a primary object of the present invention is to provide a new and improved self-adjusting ripping tooth which overcomes the above disadvantages.

More specifically, an object of the invention is to provide a pivoted ripping tooth which assumes a lowered, ripping position when rooting through earth and other relatively penetrable materials but which automatically pivots upwardly to glide over impenetrable and immovable obstructions and reenter the earth after passing over such obstructions.

Another object is to provide a pivoted ripping tooth that pivots upwardly to the level of the cutting edge when the tooth-supporting blade is at rest on a hard surface and when the equipment is backed so as to prevent tooth breakage.

A further object is to provide a pivoted tooth that can be selectively maintained in its raised position for finish-scraping operations.

Still another object is to provide a pivoted ripping tooth that rips below the cutting level of the scraper blade and dislodges boulders and other obstructions that would otherwise abuse the scraper blade and structure and lift the blade out of cutting engagement with the ground.

A further object is to provide a pivoted ripping tooth which, when ripping through the earth, applies a down pressure on the cutting edge of the scraper blade for more effective earth-cutting action.

Another object is to provide a pivoted ripping tooth which can readily be mounted on conventional scrapers, bulldozers and front end loaders, and which is reversible on the blade so that the blade itself can be reversed to utilize both edges thereof.

In furtherance of the above objects, the illusrated ripping tooth is pivotally mounted on the upper surface of the cutting blade of an earth scraper just behind the cutting edge of the blade such that the point of the tooth projects forwardly of the cutting edge. A portion of the blade immediately beneath the tooth is slotted from the cutting edge rearwardly to enable the tooth to pivot from a raised position wherein the point of the tooth is at the same level as the cutting edge of the blade to a lowered ripping position wherein the point is disposed well below the cutting edge. A stop block is mounted beneath the blade structure for limiting the downward pivoting movement of the tooth such that the point, in its downward limit position, is disposed forwardly of the tooth's pivotal axis. Locking means are provided on the tooth-mounting structure for selectively maintaining the tooth in its raised position for finish-scraping operations.

The above and other objects and advantages of the invention will become more apparent from the following description and the accompanying drawings wherein.

Figure 1:
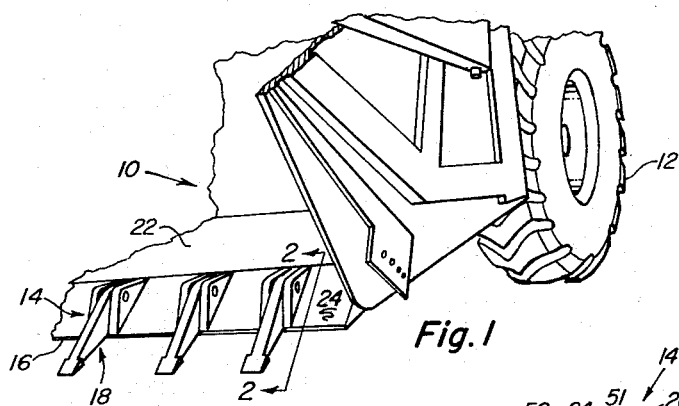
FIG. 1 is a perspective view of the bowl portion of an earth scraper having a series of ripping teeth in accordance with the present invention mounted along the cutting edge of the bowl.

With reference to the drawings, FIG. 1 illustrates a portion of an earth scraper having an earth-carrying bowl 10 just forwardly of a pair of rear wheels 12 and a downwardly inclined earth-scraping blade structure 14 at the forward end of the bowl having a cutting edge 16 for biting into the earth and lifting the same into the bowl when the machine is progressing in a forward direction. Pivotally mounted on the upper, forwardly facing surface of the blade 14 are a series of ripping teeth 18, of identical construction. Although the illustrated blade utilizes many teeth spaced along the blade, a lesser number from one to several may be used to advantage, depending on the requirements of a particular job.

Figure 2:
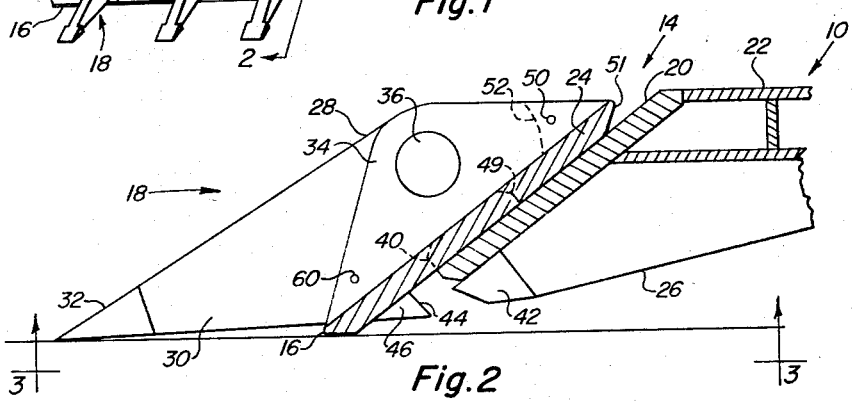
FIG. 2 is an enlarged side view, partly in section, of one of the ripping teeth and a portion of the scraper blade structure of FIG. 1 taken approximately along the line 2—2 of FIG. 1, showing the tooth in its raised position.
Figure 3:
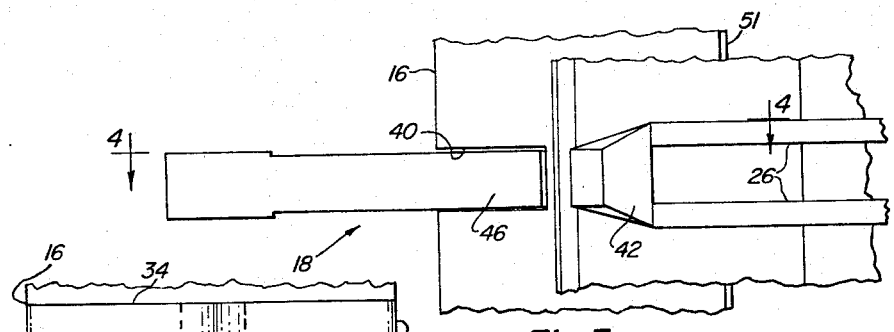
FIG. 3 is a bottom view of the ripping tooth and scraper blade structure taken along the line 3—3 of FIG. 2.

Referring to the enlarged detailed view of FIG. 2, the blade structure 14 includes a back-up plate 20 which has the same inclination as the upper surface of the blade structure and which is rigidly secured, as by welding or riveting, to the bottom structure 22 of the bowl. A scraper blade 24 is affixed to the top face of the back-up plate 20 and extends below the lower edge of the same to define at the blade's forward end the previously mentioned cutting edge 16. Reinforcing the blade structure are a series of upstanding ribs 26 whihc extend underneath the back-up plate 20 and the bowl bottom 22. The structure as described so far comprises existing structure in most conventional scrapers, whereas the structure about to be described comprises a novel ripping tooth construction which is readily adapted for mounting on the existing structure.

Figure 9:
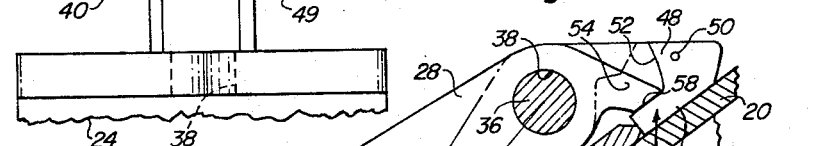
FIG. 9 is a fragmentary view of the upper surface of the blade with the tooth and back-up block removed.

Each of the ripping teeth 18 includes a main body portion 28 adjacent the rear of the tooth and a tapered leading end portion 30 including a preferably replaceable point 32. Means are provided for pivotally mounting each tooth on the blade structure. Such means include a pair of upstanding, generally triangular mounting plates 34 mounted on the upper surface of the blade 24 one on either side of the tooth. The plates carry a pivot pin 36 which extends parallel to the cutting edge through a circular opening 38 in the body of the tooth to pivotally support the same. As shown most clearly in FIGS. 4 and 9, the blade 24 is provided with a slot 40 extending from the cutting edge rearwardly beneath the tooth. The slot extends back to the front edge of the back-up plate 20 and is slightly greater in width than the tooth so as to permit the tooth to pivot freely downward from its raised position shown wherein the point of the tooth is at substantially the same level as the cutting edge 16 to a lowered, ripping position as shown in phantom lines in FIG. 4 wherein the point extends well below the level of the cutting edge.

Figure 4:
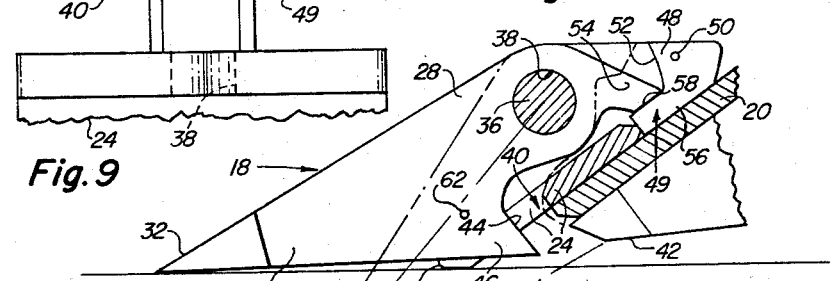
FIG. 4 is an elevational view of the ripping tooth and forward edge of the scraper blade structure taken approximately along the line 4—4 of FIG. 3, showing in solid lines the tooth in its raised position and in phantom lines the tooth in its lowered, ripping position.
Figure 5:
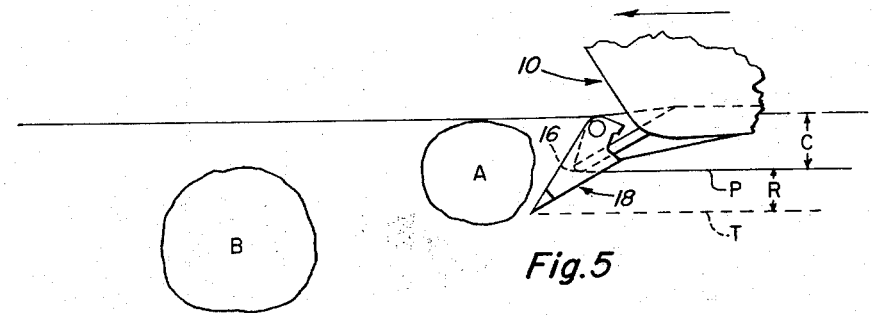
FIGS. 5 through 8 illustrate schematically the action of the pivoted ripping tooth upon striking boulders at varying depth in the ground.
Figure 6:
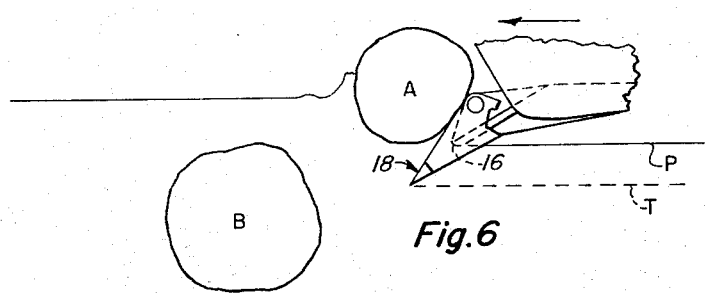

A stop block 42 is mounted beneath the forward end of the back-up plate 20 on the leading end of a pair of reinforcing ribs 26. The block serves to limit the downward pivot movement of the tooth by engaging the rear face 44 of a lower rearwardly projecting portion 46 of the tooth which extends into the slot 40. As shown in FIG. 4, when the tooth is in its lower limit position, the point of the tooth is disposed forwardly of the pivotal axis of the tooth so that the tooth pivots upwardly to its raised position upon striking a relatively hard immovable object, when resting on a hard surface, or when the machine is backed, instead of buckling under the blade structure.

A back-up block 48, shown in FIG. 4, is mounted between the mounting plates 34 within a slot 49 (FIG. 9) extending inwardly from the rear edge 51 of the blade 24 and is secured in place by a stay pin 50 carried by the mounting plates. The back-up block includes a forwardly directed, arcuate face 52 which just clears an upper, rearwardly projecting end 54 of the tooth to permit pivoting movement of the tooth. The block also includes a base portion 56 having an upper face 58 which engages the projecting end 54 of the tooth when the latter is in its raised position. Thus the back-up block limits the upward pivotal movement of the point to approximately the same level as the cutting edge. At least one of the mounting plates 34 and the tooth are provided with small through openings 60 and 62, respectively, which become aligned when the tooth is in its raised position for insertion of a retaining pin (not shown) to selectively maintain the tooth in its raised position and thus enable finish-scraping operations without necessitating removal of the tooth. As will be evident from FIG. 9, the blade is symmetrical with respect to its longitudinal centerline so that when the cutting edge 16 becomes worn excessively the blade can be reversed so that the rear edge 51 becomes the cutting edge. Attachment of the ripping tooth to the blade does not prevent reversal of the blade, for the tooth is also reversible, simply by removing the pivot pin 36 and reversing the tooth 18 in its mounting plates, and switching the back-up block 48 from the rear slot 49 to the identical front slot 40. It will be noted that the holes 50 and 60 in the mounting plates 34 are also symmetrically placed with respect to the opening for the pin 36 so that their functions are interchangeable.

As shown in FIG. 4, the lowered, ripping position of the tooth is preferably selected so that the tooth will readily enter the material to be removed. It has been found that for relatively hard, rocky ground an earth-entering angle $a$ of about 45° or slightly greater is desirable, to impart a substantial downward pressure to the cutting edge 16 and thus permit it to bite more readily into the earth instead of being forced out of the ground by the material being loaded. At the same time, the ripping angle $a$ should be less than 90° so that the tooth will be self-adjusting to automatically swing upwardly upon striking an impenetrable object such as a boulder, thereby preventing tooth breakage. The provision of teeth near the opposite ends of the cutting edge 16 are advantageous in that they keep the corners of the blade digging and prevent the scraper from sliding away from the toe of a slope, thus enabling ditches and slopes to be cut more easily.

Figure 7:
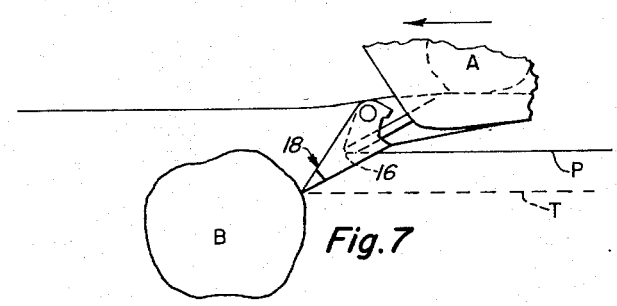

When a conventional scraper blade without ripping teeth strikes a rock such as the boulder B at the point shown in FIG. 7, the cutting edge may push the boulder along for a short distance if the boulder is not too firmly embedded. If this happens, the boulder may be dislodged sufficiently so that it begins to roll. The cutting edge will then follow the boulder as it rolls and will be lifted out of the ground. As the scraper passes over the boulder, the entire weight of the bowl is concentrated on the boulder until the scraper cleans the boulder, permitting the cutting edge to reenter the ground. The foregoing action lengthens the loading cycle considerably and causes serious abuse to the bottom of the bowl and the blade.

The improved operation of a scraper equipped with the above-described pivoted ripping tooth or teeth is illustrated schematically in FIGS. 5 through 8. As shown progressively in FIGS. 5 and 6, the bowl 10 of the loader approaches a boulder A laying just beneath the ground surface and a larger boulder B embedded at a slightly greater depth. The pivoted tooth 18 initially engages the lower portion of boulder A with the tooth in its ripping position, ripping at a depth R below the depth of cut C. Upon contact with the boulder A, the ripping tooth burrows under the boulder and lifts the same before the cutting edge 16 reaches it, thereby enabling the boulder to enter the bowl upon continued forward progress of the machine. In the absence of the tooth it will be noted that the blade would have been severely abused and the boulder A would not have been loaded.

Figure 8:
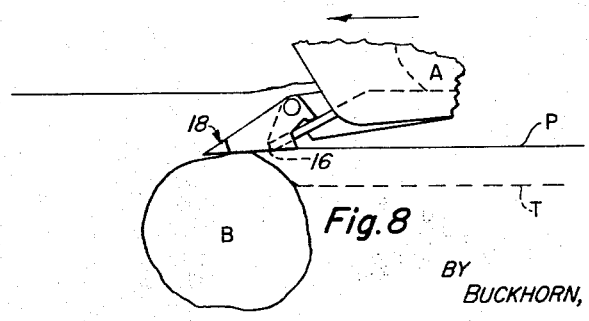

Referring to FIG. 7, continued travel of the loader causes the point of the tooth 18 to engage the second boulder B extending well below the path T of the ripping tooth so that the tooth engages the upper half of the boulder, making it impossible for the tooth to burrow under and lift it. As shown in FIG. 8, continued forward movement of the loader forces the tooth to pivot upward and glide over the boulder, with the cutting edge 16 clearing the boulder also. After passing over the boulder, the tooth reenters the ground. It will be noted that during the preceding events the cutting dege 16 continued cutting, without deviation, along its original cutting path P. During the next loading cycle the path T of the ripping tooth will be deep enough so that the tooth will burrow under the boulder B and force it into the bowl in the same manner as illustrated with respect to boulder A.

It will be apparent that only the teeth 18 directly in the path of boulders such as boulder B will be forced upwardly and that the remaining teeth 18 on the blade continue to rip so as to continue the downward pressure on the cutting edge 16 as the affected tooth or teeth glide over the boulder.

Scrapers equipped with the pivoted ripping teeth can also be used advantageously on jobs to increase the efficiency of scrapers without teeth by alternating scrapers having teeth with toothless scrapers. A toothed scraper will rip material for the next loading cycle, whereupon a toothless scraper can follow up, loading the previously ripped material.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:
1. In an earth-moving apparatus having an earth-scraping blade structure with a lower blade portion having a leading lower cutting edge,
   a ripping tooth pivoted to the forwardly facing surface of said lower blade portion and having a leading end extending in a forward direction from the pivotal axis of said tooth,
   said tooth being freely pivotable from a raised position wherein said leading end is at least at substantially the same level as said cutting edge to a lowered limit position wherein said leading end is disposed below said cutting edge and forwardly of said pivotal axis.

2. In an earth-moving apparatus having an earth-scraping blade structure with a lower blade portion having a leading lower cutting edge,
   a ripping tooth including a leading end extending forwardly of said cutting edge, means pivotally mounting said tooth on the forward face of said lower blade portion for free movement about its pivot axis from a lowered, ripping positions wherein said leading end extends below the level of said cutting edge to a raised, grading position wherein said leading end is at least as high as the level of said cutting edge, and stop means positioned on said blade structure so as to limit the downward pivoting movement of said tooth such that said leading end is positioned forwardly of said pivotal axis of said tooth to an extent permitting the upward pivoting movement of said tooth upon the same striking an impenetrable object during the forward motion of said apparatus when said tooth is in its lowermost position.

3. A ripping tooth according to claim 2 wherein an imaginary line connecting the tip of the leading end portion of said tooth and said pivotal axis passes through said tooth at all points along said line and wherein said line extends at an angle greater than forty-five degrees and less than ninety degrees when said tooth is in its lower limit position.

4. In an earth-moving apparatus having an earth-scraping blade structure with a forward cutting edge, a ripping tooth including a tapered leading end portion, means pivotally mounting said ripping tooth on said blade structure for movement about a pivotal axis passing through said tooth and with said leading end portion extending forwardly of said cutting edge, such that said tooth is freely pivotable to positions wherein said leading end is disposed below the level of said cutting edge, first stop means on said blade structure for limiting the downward pivotal movement of said tooth such that in its lowermost position said leading end is disposed forwardly of said pivotal axis, and second stop means on said blade structure for limiting the upward pivotal movement of said tooth such that in its uppermost position said leading end is at substantially the same level as said cutting blade.

5. In an earth-moving apparatus having an earth-scraping blade structure with a forward lower cutting edge, a ripping tooth, means pivotally mounting said ripping tooth on the forwardly facing surface of said blade structure adjacent said cutting edge for movement about a pivotal axis passing through said tooth and extending generally parallel to and adjacent said cutting edge, and with said leading end portion forwardly of said cutting edge, said tooth being freely pivotable from a lower, ripping position wherein said leading end is disposed below the level of said cutting edge to an upper, grading position wherein said leading end is at least at substantially the same level as said cutting edge, and stop means on said blade structure for limiting the downward pivotal movement of said tooth such that said leading end is disposed forwardly of said pivotal axis.

6. In an earth-moving apparatus having an earth-scraping blade structure with a forward cutting edge, a ripping tooth, means pivotally mounting said ripping tooth on a forwardly facing surface of said blade structure for movement about a pivotal axis passing through said tooth and extending generally parallel to and adjacent said cutting edge, said tooth including a leading end disposed forwardly of said pivotal axis and said cutting edge, said tooth being freely pivotable about said axis from a lowered ripping position wherein said leading end is disposed below said cutting edge to a raised, grading position wherein said leading end is disposed at substantially the same level as said cutting edge, stop means on said blade structure for limiting the downward pivoting movement of said tooth such that said leading end is disposed forwardly of said pivotal axis when in its lowermost ripping position, and means for selectively locking said tooth in its raised position for finish-scraping operations.

7. In an earth-moving apparatus having an earth-scraping blade structure with a forward cutting edge, means pivotally mounting said ripping tooth on the forwardly facing surface of said blade structure for movement about a pivotal axis passing through said tooth and extending generally parallel to said cutting edge, said tooth including an earth-ripping leading end disposed forwardly of said cutting edge, said tooth being freely pivotable from a lowered, ripping position wherein said point is disposed below said cutting edge to a raised, grading position wherein said point is at substantially the same level as said cutting edge, first stop means for limiting the downwardly pivoting movement of said tooth such that said leading end is disposed forwardly of said pivotal axis in the lowermost position of said tooth, second stop means for limiting the upward pivotal movement of said tooth such that said leading end is disposed at approximately the same level as said cutting edge in the uppermost position of said tooth, and means for selectively locking said tooth in said uppermost limit position for finish-scraping operations.

8. A ripping tooth for an earth-scraping blade of earth-moving apparatus, said tooth comprising:

a generally triangular-shaped tooth member having a tapered leading end and a trailing end portion having a pivot opening extending therethrough, a mounting bracket including a pair of opposite side members and a pivot pin for extending through said pivot opening and pivotally mounting said tooth member on the forwardly directed surface of said earth-scraping blade with said leading end extending forwardly of the lower edge of said blade, the lower trailing end portion of said tooth member including a cut-out portion defining abutment means for limiting the downward pivotal movement of said tooth such that said leading end is disposed below the lower edge of said blade and forwardly of the pivotal axis of said tooth in the lowermost position of said tooth.

9. A ripping tooth according to claim 8 wherein said cut-out portion defines:

a lower projecting portion defining said abutment means for cooperation with said stop means in limiting the downward pivoting movement of said tooth, and an upper projecting portion extending rearwardly from the main body portion of said tooth member above said lower projecting portion for limiting the upward pivoting movement of said tooth.

10. An earth-moving apparatus comprising:

a scraper blade structure having a forward cutting edge, said blade structure being provided with a slot extending rearwardly from said cutting edge, a ripping tooth pivotally mounted on the forwardly directed earth-engaging surface of said blade structure adjacent said cutting edge, said tooth including a projecting lower tooth portion extending into said slot and a tapered leading end extending forwardly of said cutting edge, said tooth being freely pivotable from a raised position wherein said leading end is disposed at least at substantially the same level as said cutting edge to a lowered position wherein said leading end is disposed below the level of said cutting edge, and stop means mounted on the rearwardly directed side of said blade structure adjacent said slot for engaging said projecting portion of said tooth when said tooth is in its lowered position and thereby limiting the downward pivoting movement of said tooth, said stop means being positioned such that said tooth when in its downward limit position has its leading end disposed forwardly of the pivotal axis of said tooth.

11. In an earth-moving apparatus having an earth-scraping blade structure,
a scraper blade carried by a lower portion of said blade structure,
said scraper blade having longitudinally extending upper and lower edge portions,
said scraper blade being reversible on said blade structure so that each of said longitudinally extending edge portions defines an earth-cutting edge when positioned lowermost with respect to the remainder of said blade,
a ripping tooth including a leading end extending forwardly of said cutting edge,
tooth-mounting means on the forward face of said blade pivotally mounting said tooth for movement from an upper position wherein said leading end is at or above the level of said cutting edge to a lower position wherein said leading end is below the level of said cutting edge,
said tooth being reversible in said mounting means so that upon reversal of said blade on said blade structure, said tooth can be reversed to assume the same position with respect to the new cutting edge of said blade as it assumed with respect to the original said cutting edge.

References Cited by the Examiner

UNITED STATES PATENTS

| | | | |
|---|---|---|---|
| 2,105,320 | 1/1938 | Heil | 37—145 |
| 2,219,160 | 10/1940 | White | 37—145 |
| 2,262,415 | 11/1941 | Williams et al. | 37—145 |
| 2,797,506 | 7/1957 | Hilliard | 37—145 |
| 2,837,844 | 6/1958 | Launder | 37—145 |
| 2,840,931 | 7/1958 | Appel | 37—145 |
| 2,840,932 | 7/1958 | Breyer | 37—145 |

FOREIGN PATENTS

| | | |
|---|---|---|
| 645,320 | 10/1950 | Great Britain. |
| 478,126 | 2/1953 | Italy. |

ABRAHAM G. STONE, *Primary Examiner.*

JOE O. BOLT, Jr., WILLIAM A. SMITH III,
*Examiners.*